(12) United States Patent
Schneider, Jr.

(10) Patent No.: US 10,408,958 B2
(45) Date of Patent: Sep. 10, 2019

(54) SYSTEMS AND METHODS FOR DETECTING SUBSURFACE FEATURES USING 3D ANGLE GATHERS

(71) Applicant: Fairfield Industries Incorporated, Sugarland, TX (US)

(72) Inventor: William Aeppli Schneider, Jr., Sugar Land, TX (US)

(73) Assignee: Fairfield Industries Incorporated, Sugarland, TX (US)

( * ) Notice: Subject to any disclaimer, the term of this patent is extended or adjusted under 35 U.S.C. 154(b) by 732 days.

(21) Appl. No.: 14/806,418

(22) Filed: Jul. 22, 2015

(65) Prior Publication Data

US 2017/0023688 A1   Jan. 26, 2017

(51) Int. Cl.
| | | |
|---|---|---|
| *G01V 1/30* | (2006.01) | |
| *G01V 1/34* | (2006.01) | |
| *G01V 1/36* | (2006.01) | |
| *G01V 1/32* | (2006.01) | |

(52) U.S. Cl.
CPC .............. *G01V 1/306* (2013.01); *G01V 1/301* (2013.01); *G01V 1/325* (2013.01); *G01V 1/34* (2013.01); *G01V 1/36* (2013.01); *G01V 2210/14* (2013.01); *G01V 2210/51* (2013.01); *G01V 2210/74* (2013.01)

(58) Field of Classification Search
CPC .................................................... G01V 1/306
See application file for complete search history.

(56) References Cited

U.S. PATENT DOCUMENTS

| | | | |
|---|---|---|---|
| 5,963,879 A | 10/1999 | Woodward et al. | |
| 7,768,872 B2 * | 8/2010 | Kappius | G01V 1/28 |
| | | | 367/56 |
| 2009/0296524 A1 | 12/2009 | Meier | |
| 2011/0261646 A1 | 10/2011 | MacNeill et al. | |
| 2011/0295510 A1 | 12/2011 | Gulati | |
| 2012/0075954 A1 | 3/2012 | Xu et al. | |
| 2014/0172307 A1 | 6/2014 | Svay et al. | |
| 2014/0247693 A1 | 9/2014 | Haacke | |

FOREIGN PATENT DOCUMENTS

WO   WO-2004/046758 A1   6/2004

OTHER PUBLICATIONS

International Search Report issued in application No. PCT/US2016/042782 dated Oct. 6, 2016.
Tang 3D Angle Gathers with Plane-Wave Reverse-Time Migration, Mar.-Apr. 2013, Geophysics, vol. 78.

* cited by examiner

*Primary Examiner* — Yu-Hsi D Sun
(74) *Attorney, Agent, or Firm* — Foley & Lardner LLP; James De Vellis

(57) ABSTRACT

The present disclosure is directed to detecting subsurface features via a seismic survey. A system can obtain seismic data from nodes separated from each other by at least a threshold distance on a ground surface. The seismic data can include image trace data based on field trace data detected from each of the plurality of seismic data acquisition units. The system retrieves a sample interval and a parameter. The system configures a bandlimited binning function with the sampling interval and the predetermined parameter. The system applies the bandlimited binning function to a plurality of image traces of the image trace data to generate a bandlimited angle gather value for a bin in an angle gathers grid. The system generates an image based on the angle gathers grid and provides the image for display.

20 Claims, 12 Drawing Sheets

SYSTEMS AND METHODS FOR DETECTING SUBSURFACE FEATURES USING 3D ANGLE GATHERS

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

At least one aspect is directed to a method of detecting subsurface features via a seismic survey. The method can include one or more processors of a data processing system obtaining seismic data. The data processing system can obtain seismic data detected by a plurality of seismic data acquisition units separated from each other by at least a threshold distance on a ground surface. The seismic data can include image trace data based on field trace data detected by each of the plurality of seismic data acquisition units. The data processing system can retrieve, from a binning function data structure in memory, a sampling interval and a parameter. The data processing system can configure a bandlimited binning function with the sampling interval and the parameter. The data processing system can apply the bandlimited binning function to a plurality of image traces of the image trace data to generate a bandlimited angle gather value for a bin in an angle gathers grid. The data processing system can generate an image based on the angle gathers grid. The data processing system can provide the image for display via a display device. The image can indicate at least one of a subsurface lithological formation and a hydrocarbon deposit.

At least one other aspect is directed to a system for detection of subsurface matter via a seismic survey. The system can include a plurality of seismic data acquisition units separated from each other by at least a threshold distance on a ground surface. The system can include a data processing system having one or more processors. The data processing system can include a binning engine and an image generator executed by the one or more processors. The data processing system can obtain seismic data detected by the plurality of seismic data acquisition units. The seismic data can include image trace data from each of the plurality of seismic data acquisition units or generated based field trace from each of the plurality of seismic data acquisition units. The data processing system can retrieve, from a binning function data structure in memory, a sampling interval and a parameter. The data processing system can configure a bandlimited binning function with the sampling interval and the parameter. The data processing system can apply the bandlimited binning function to a plurality of image traces of the image trace data to generate a bandlimited angle gather value for a bin in an angle gathers grid. The data processing system can generate an image based on the angle gathers grid. The data processing system can provide the image for display via a display device. The image can indicate at least one of a subsurface lithological formation and a hydrocarbon deposit.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
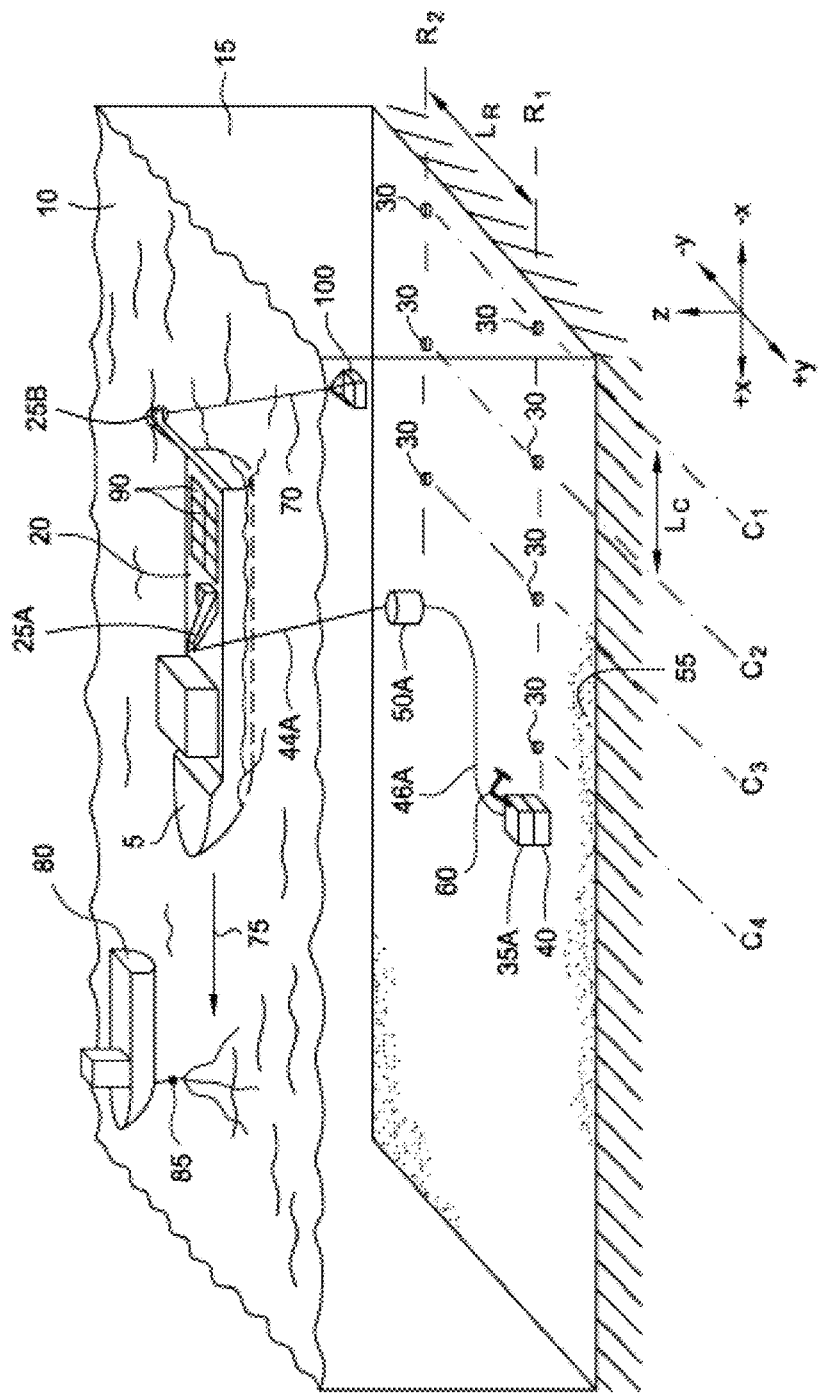
FIG. 1 is an isometric schematic view of an embodiment of a seismic operation in deep water.

Systems and methods described herein are generally directed to detecting or depicting subsurface features using seismic data acquisition units. The systems and methods can use shot migration data including shot migration image traces obtained from a seismic data acquisition unit to generate 3-dimensional ("3D") angle gathers. The systems and methods can use the 3D angle gathers to generate and plot an image that indicates subsurface features (or reflectors), such as, e.g., underground or under sea floor lithologic formations, hydrocarbon, oil or gas deposits, geological features, etc.

The data processing system can construct a 3D angle gather at a fixed (x,y) location as part of a 3D seismic imaging process. A 3D image may be a function of (x,y,z), where x and y may represent a horizontal plane that is parallel to the surface of the earth, and z represents a depth below the surface of the earth that is perpendicular to the horizontal x-y plane. A 3D angle gather may be a function of $(\phi,\gamma,z)$, where $\phi$ refers to the subsurface reflection azimuth angle and $\gamma$ refers the subsurface reflection angle. Angle $\gamma$ may be defined as angle of incidence or reflection with respect to the normal vector of a subsurface reflector.

In an illustrative implementation, a data processing system constructs a 3D angle gather at a fixed location, such as an (X,Y) location. To do so, the data processing system extracts an image trace at the (X,Y) location from each migrated common receiver gather (or seismic data acquisition unit). The image trace can include one or more depth samples. The data processing system then determines a subsurface reflection azimuth angle ("$\phi$") and an angle of incidence (or reflection) with respect to a normal vector of a subsurface reflector ("$\gamma$") associated with each depth sample of each image trace. The data processing system can define or initiate a 3D angle gathers grid using coordinates ($\phi,\gamma,z$) and using a binning technique to determine the nearest location in the angle gathers grid for each depth sample of each image trace. The binning technique can include a bandlimited binning function. The data processing system can sum the amplitudes of the image traces that map to the same location in the angle gathers grid.

The data processing system can apply the bandlimited binning techniques to generate 3D angle gathers using seismic image traces obtained from ocean bottom seismic data acquisition units via 3D shot profile migration or 3D reverse time migration. The data processing system can use these high quality, improved 3D angle gathers for further processing or as part of additional analysis techniques, such as to generate improved velocity models, images, geological dip models, etc. The data processing system can apply source-receiver reciprocity and may perform the imaging on common-receiver gathers or common-node gathers. The data processing system can apply the bandlimited binning techniques to 3D Kirchhoff imaging of node data. In some embodiments, the data processing system can apply the bandlimited binning techniques to marine streamer data or land seismic data. Streamer data may refer to data obtained by towing several streamers behind a boat. For example, each streamer may include hundreds of geophones or hydrophones, located at regular intervals. Streamers may be as long as 6 to 10 km. A source of seismic energy may be positioned close to the stern of the boat. The boat can moves over the target on multiple passes along straight lines.

The data processing system can facilitate generating bandlimited 3D angle gathers or an image based on the bandlimited 3D angle gathers with minimal, fewer, or no unwanted artifacts due to undersampling or aliasing. For example, seismic data may be undersampled or aliased in the angles $\phi$ and $\gamma$ because angle gathers may be constructed from seismic data that is discretely sampled in source and receiver coordinates. This undersampling may be caused by choosing angular sample intervals $\Delta\phi$ and $\Delta\gamma$ for the angle gathers grid that are too small. Undersampling can arise when the maximum angular wavenumbers (bandwidth) represented by the angle gathers grid are not be supported by the data.

To generate an image with few or no unwanted artifacts due to undersampling or aliasing, the data processing system can apply bandlimited binning function to construct unaliased 3D angle gathers regardless of the $\Delta\phi$ and $\Delta\gamma$ that are chosen to define the 3D angle gathers grid. Poor quality angle gathers can result in reduced quality image simply because the critical velocity estimation step may not be successful. Thus, by generating improved quality angle gathers using the bandlimited binning function that can be tuned based on sampling intervals and parameters, the data processing system can generate not only improved angle gathers (e.g., 2D or 3D) but also an improved image. Therefore, the data processing system can remove the dependence on the sampling intervals $\Delta\phi$ and $\Delta\gamma$ on the spatial sampling of the actual seismic data.

For example, the Fourier transform of a 3-D angle gather in the variables $\phi$ and $\gamma$ gives the angular wavenumber representation in terms of angular wavenumber variables $k_\phi$ and $k_\gamma$, respectively. The largest angular wavenumbers that can be represented on a discrete grid in the variables $\phi$ and $\gamma$ that is sampled at intervals $\Delta\phi$ and $\Delta\gamma$ are $\pi/\Delta\phi$ and $\pi/\Delta\gamma$, respectively. These are the Nyquist angular wavenumbers. In this example, the angles may be defined in radians. In some cases, the equations and angles may be defined in degrees. The maximum angular wavenumbers that may be present on the discrete angle gathers grid may be $\pi/\beta\Delta\phi$ and $\pi/\alpha\Delta\gamma$, where $\beta$ and $\alpha$ are tuning parameters that are real numbers $\geq 1$. Binning may be performed using a binning or gridding function that has wavenumbers less than or equal to the Nyquist wavenumbers.

By using the bandlimited binning function, the data processing system can select $\Delta\phi$ and $\Delta\gamma$ as desired. Further, the data processing system (or a user thereof) may increase tuning parameters $\beta$ and $\alpha$ from 1 until the maximum angular wavenumbers are small enough to prevent aliased angle gathers. For example, the data processing system may iteratively adjust the tuning parameters to generate updated or new angle gathers and images for display. A user of the data processing system may view the angle gathers or image to determine whether they have fewer or no artifacts. The data processing system may generate a set of equivalent bandwidth angle gathers for different $\Delta\phi$ and $\Delta\gamma$ by varying the $\beta$ and $\alpha$ so that the maximum angular wavenumbers $\pi/\beta\Delta\phi$ and $\pi/\alpha\Delta\gamma$ remain constant.

To perform the bandlimited binning function, the data processing system obtains, retrieves, receives or otherwise identifies one or more sampling intervals and one or more parameters. For example, the data processing system may retrieve, from a data structure in memory, or receive via a user interface, values for $\Delta\phi$, $\Delta\gamma$, $\beta$, and $\alpha$. The tuning parameters $\beta$ and $\alpha$ are real numbers $\geq 1$. The angles $\phi$ and $\gamma$ may be in units of radians. The data processing system can obtain a binning function and configure the binning function with the sampling interval and parameters. For example, the binning function may include a sinc function, in which case the data processing system can configure the binning functions as follows: $\mathrm{sinc}(\phi)=\sin(\pi\phi/\beta\Delta\phi)/(\pi\phi/\beta\Delta\phi)$; $\mathrm{sinc}(\gamma)=\sin(\pi\gamma/\alpha\Delta\gamma)/(\pi\gamma/\alpha\Delta\gamma)$.

The data processing system can create a 3D angle gathers grid that is sampled uniformly at intervals $\Delta\phi$, $\Delta\gamma$ and $\Delta z$. The data processing system may initialize the grid by placing a 0 value at every location in the grid. In some cases, the $\Delta z$ may be chosen to equal the depth sample interval of the seismic image traces.

The data processing system can use the binning function configured with the sampling interval to populate the 3D angle gathers grid. For example, the data processing system may obtain seismic data that includes a set of N image traces at a fixed surface location (x,y) that derive from imaging N common receiver gathers (or seismic data acquisition units). The $n^{th}$ of these image traces for fixed (x,y) may be represented by $I_n(z)$. The data processing system can also obtain, identify, or determine a depth variable mapping of each image trace to the angle domain. For example, the mapping for the $n^{th}$ image trace and fixed (x,y) can be $(x,y,z)_n \rightarrow [\phi_n(z), \gamma_n(z)]$. The mapping can be stored in a depth variable mapping data structure for each image trace.

In one example, the data processing system can use this mapping and the binning function to generate a 3D angle gather for a fixed surface image location (x,y) as follows:

$$G(x,y;\phi,\gamma,z)=\Sigma_n I_n(z)\mathrm{sinc}[\phi-\phi_n(z)]\mathrm{sinc}[\gamma-\gamma_n(z)],$$

The data processing system can perform the summation $\Sigma_n$ from n=1 to n=N image traces and allow all N image traces to contribute to the 3-D angle gather $G(x,y;\phi,\gamma,z)$. The data processing system can generate a 3D angle gather grid for a single fixed (x,y) location, while varying the $\phi$, $\gamma$ and z and variables. As shown in the example equation above, the data processing system can use a bandlimited binning function that includes a sinc function.

By using the bandlimited binning techniques of the present solution, the data processing system may generate an image with fewer artifacts due to aliasing as compared to an image based on angle gathers that are not generated using the bandlimited binning function. The data processing system may further generate the image using less data because fewer seismic data acquisition nodes can be used to produce a suitable image of the same geographic area (e.g., nodes can be separated by 400 meters to 1100 meters). Thus, the data processing system can generate a suitable image using fewer computational resources, fewer memory resources, and fewer seismic data acquisition nodes. By using fewer seismic data acquisition nodes to cover the same or greater geographic area, a marine seismic operation, for example, may be performed using a smaller marine vessel and in less time. Thus, the data processing system can facilitate detecting subsurface features.

Referring now to FIG. 1, an isometric schematic view of an embodiment of a seismic operation in deep water facilitated by a first marine vessel 5 is shown. The data processing system can obtain the seismic data via the seismic operation. While this figure illustrates a deep water seismic operation, the systems and methods described herein can use seismic data obtained via streamer data, land-based seismic operations. In this example, the first vessel 5 is positioned on a surface 10 of a water column 15 and includes a deck 20 which supports operational equipment. At least a portion of the deck 20 includes space for a plurality of sensor device racks 90 where seismic sensor devices (or seismic data acquisition units or nodes) are stored. The sensor device racks 90 may also include data retrieval devices or sensor recharging devices.

The deck 20 also includes one or more cranes 25A, 25B attached thereto to facilitate transfer of at least a portion of the operational equipment, such as an autonomous underwater vehicle (AUV), autonomously operated vehicle (AOV), an ROV or seismic sensor devices, from the deck 20 to the water column 15. For example, a crane 25A coupled to the deck 20 is configured to lower and raise an ROV 35A, which transfers and positions one or more sensor devices 30 (e.g., OBS units) on a seabed 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, etc.) to a stern of the first vessel 5, or other locations on the first vessel 5. Each of the cranes 25A, 25B may be any lifting device or launch and recovery system (LARS) adapted to operate in a marine environment. The crane 25B may be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. In some embodiments, the transfer device 100 may not include any integral power devices or not require any external or internal power source. In some embodiments, the cable 70 may provide power or control to the transfer device 100. In some embodiments, the transfer device 100 can operate without external power or control. In some embodiments, the cable 70 may include an umbilical, a tether, a cord, a wire, a rope, and the like, that is configured to support, tow, position, power or control the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the node does not require external communication or control. The seismic sensor device 30 may include several geophones configured to detect acoustic waves that are reflected by subsurface lithologic formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55 or ground surface 55 or sea floor 55 or earth surface 55 in a land based deployment. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer device 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In one embodiment, the ROV 35A may be sequentially positioned adjacent each seismic sensor device 30 on the seabed 55 and the seismic sensor devices 30 are rolled, conveyed, or otherwise moved from the seabed 55 to the storage compartment 40. In another embodiment, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 can ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows $R_n$ in the X direction ($R_1$ and $R_2$ are shown) or columns $C_n$ in the Y direction ($C_1$-$C_4$ are shown), wherein n equals an integer. In one embodiment, the rows $R_n$ and columns $C_n$ define a grid or array, wherein each row $R_n$ comprises a receiver line in the width of a sensor array (X direction) or each column $C_n$ comprises a receiver line in a length of the sensor array (Y direction). The distance between adjacent sensor devices 30 in the rows is shown as distance $L_R$ and the distance between adjacent sensor devices 30 in the columns is shown as distance $L_C$. While a substantially square pattern is shown, other patterns may be formed on the seabed 55. Other patterns include non-linear receiver lines or non-square patterns. The pattern(s) may be pre-determined or result from other factors, such as topography of the seabed 55. In some embodiments, the distances $L_R$ and $L_C$ may be substantially equal (e.g., plus or minus 10% of each other) and may include dimensions between about 60 meters to about 400 meters. In some embodiments, the distances $L_R$ and $L_C$ may be different. In some embodiment, the distances $L_R$ or $L_C$ may include dimensions between about 400 meters to about 1100 meters. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In this embodiment, wherein two receiver lines (rows $R_1$ and $R_2$) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row $R_1$ may be deployed. When the single receiver line is completed a second vessel 80 is used to provide a source signal. The second vessel 80 is provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row $R_1$ in this example). During the time the second vessel 80 is making the passes, the first vessel 5 continues deployment of a second receiver line. However, the time involved in making the passes by the second vessel 80 can be shorter than the deployment time of the second receiver line. This causes a lag time in the seismic survey as the second vessel 80 sits idle while the first vessel 5 is completing the second receiver line.

In this and other embodiments, the first vessel 5 utilizes one ROV 35A to lay sensor devices to form a first set of two receiver lines (rows $R_1$ and $R_2$) in any number of columns, which may produce a length of each receiver line of up to and including several miles. The two receiver lines (rows $R_1$ and $R_2$) can be substantially parallel, e.g. within +/−20 degrees of parallel. When a single directional pass of the first vessel 5 is completed and the first set (rows $R_1$, $R_2$) of seismic sensor devices 30 are laid to a predetermined length, the second vessel 80, provided with the source device 85, is utilized to provide the source signal. The second vessel 80 may make eight or more passes along the two receiver lines to complete the seismic survey of the two rows $R_1$ and $R_2$.

While the second vessel 80 is shooting along the two rows $R_1$ and $R_2$, the first vessel 5 may turn 180 degrees and travel in the −X direction in order to lay seismic sensor devices 30 in another two rows adjacent the rows $R_1$ and $R_2$, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows $R_1$ and $R_2$ are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A or the spacing (distance $L_R$) between sensor devices 30.

Figure 2:
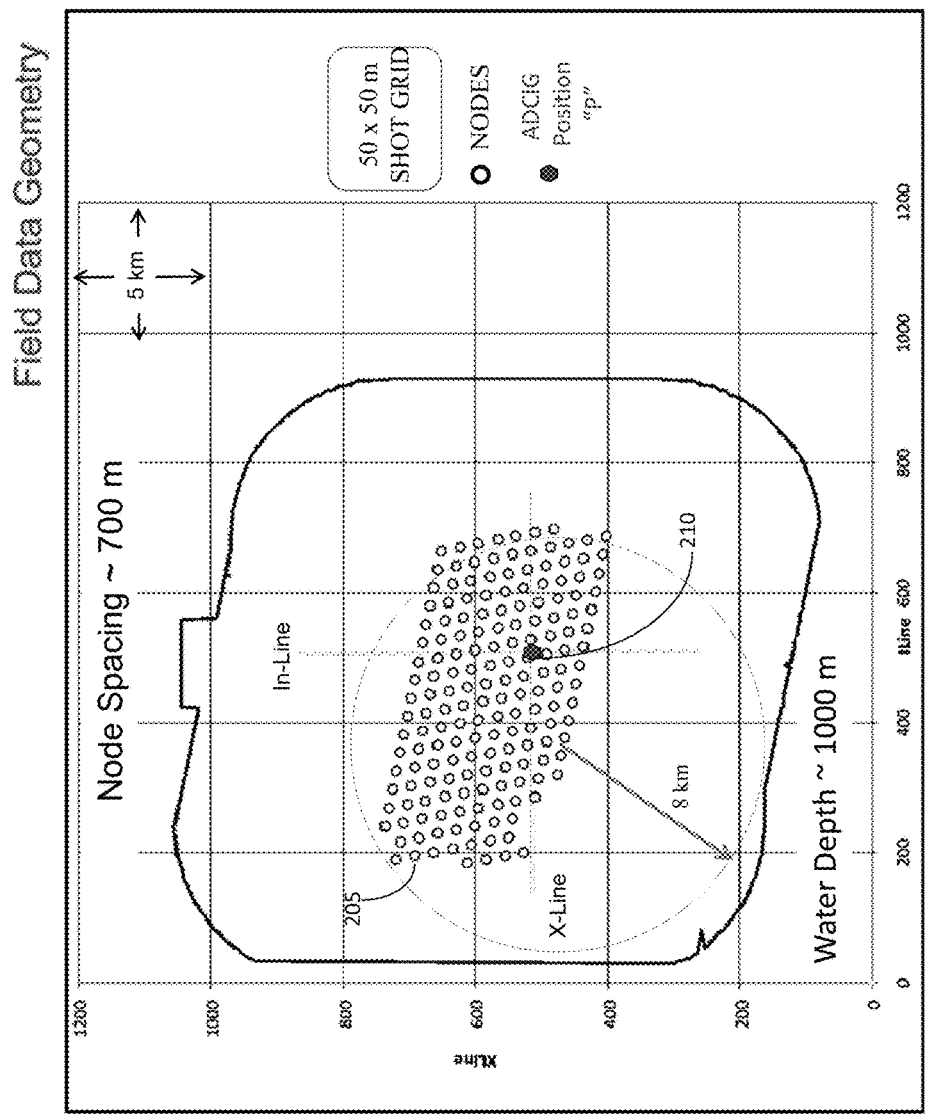
FIG. 2 is a diagram illustrating a shot grid, in accordance with an embodiment.

FIG. 2 is a diagram illustrating a shot grid, in accordance with an embodiment. In this example, the seismic data acquisition units 205 are separated from one another by approximately (e.g., plus or minus 10%) 700 meters. The nodes are placed on a sea floor approximately 1000 meters below a surface of water (e.g., plus or minus 10%). The angle domain common image gathers ("ADCIG") position 210 is illustrated at the intersection of the in-line and x-line. By using the systems and methods described herein, the spacing between seismic data acquisition units can be increased while maintaining or improving image quality.

Figure 3:
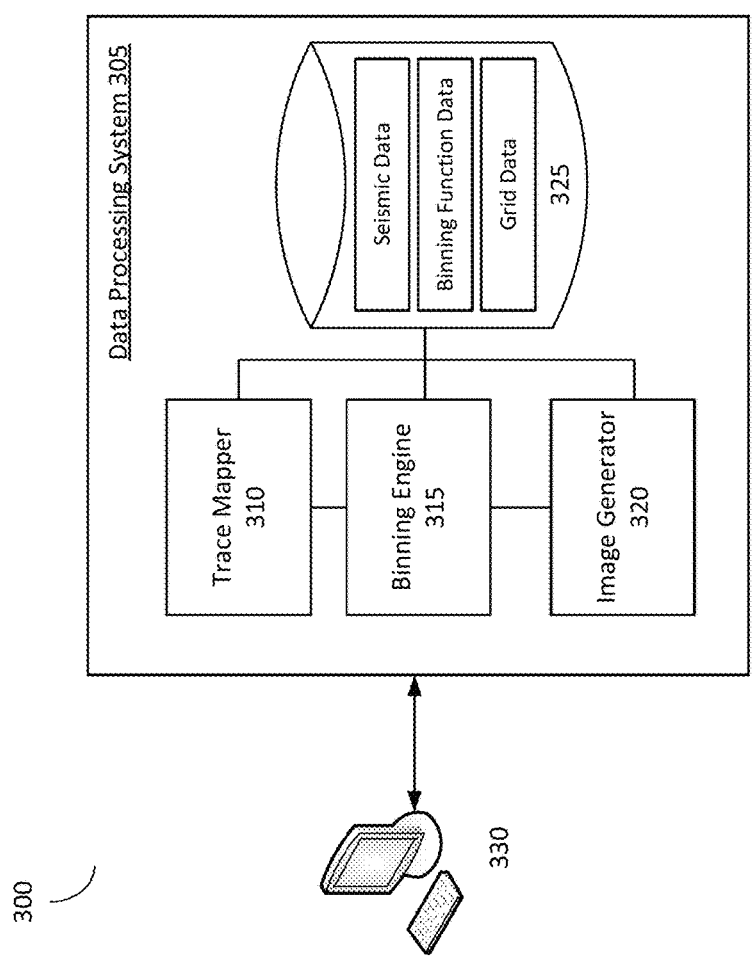
FIG. 3 is a block diagram of an embodiment of a system for detection of subsurface matter via a seismic survey.

Referring now to FIG. 3, a system 300 for detection of subsurface features via a seismic survey is shown. The system 300 can include at least one data processing system 305. The system can include at least one computing device 330 or display device 330. The data processing system 305 can include trace mapper 310, a binning engine 315, image generator 320 and a database 325 or data repository 325 that stores data records or data structures including, for example, seismic data, binning function data, and grid data. The trace mapper 310, binning engine 315 and image generator 320 can each include at least one processing unit or other logic device such as programmable logic array engine, or module configured to communicate with the database repository or database 325. The trace mapper 310, binning engine 315, image generator 320 and data repository 325 can be separate components, a single component, or part of the data processing system 305. The system 300 and its components, such as a data processing system, may include hardware elements, such as one or more processors, logic devices, or circuits.

The data processing system 305 can include at least one logic device such as a computing device having a processor to communicate via a network, for example with the computing device 330. The data processing system 305 can include at least one server. For example, the data processing system 305 can include a plurality of servers located in at least one data center. The data processing system 305 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms.

In some embodiments, the data processing system 305 can include a trace mapper 310 designed and constructed to map an image trace to angles. The trace mapper 310 can obtain seismic data from the database 325 and map the image trace data to angle data or determine angles using image trace data. The data processing system 305 can obtain seismic data detected by a plurality of seismic data acquisition units separated from each other by at least a threshold distance on a ground surface, as illustrated in FIG. 1.

The seismic data can include field trace data from each of the plurality of seismic data acquisition units. The seismic data can include image trace data. For example, each seismic data acquisition unit may record field trace data detected via a geophone of the seismic data acquisition unit and recorded via a seismic data recorder. The data processing system 305 can obtain field trace data detected by the seismic data acquisition units. The data processing system 305 can image the field trace data using seismic migration to produce the image trace data.

Seismic migration may include geometrically re-locating seismic events identified in the field trace data in either space or time to the location the event occurred in the subsurface rather than the location that it was recorded at the surface by the seismic data acquisition unit, thereby creating a more accurate image of the subsurface. The data processing system can perform seismic migration to move dipping reflectors to their more accurate or true subsurface positions and collapse diffractions, resulting in a migrated image that can have an increased spatial resolution and can resolve areas of complex geology better than non-migrated images.

The data processing system 305 can apply a depth migration technique to seismic data in depth (e.g., Cartesian)

coordinates, which can be calculated from seismic data in time coordinates. The data processing system can use a velocity model. Generating a velocity model may be an iterative process. The data processing system can use one or more seismic migration techniques, including, e.g., Kirchhoff depth migration, Reverse Time Migration (RTM), Gaussian Beam Migration and Wave-equation migration.

An image trace may include, be based on or referred to a seismic trace or field trace. A seismic trace may be characterized by the corresponding positions of a source and receiver in a seismic survey. For example, the coordinates of the source and receiver may be defined relative to an orthogonal coordinate system, with x and y as the horizontal axis and z as the vertical axis. The source position may be a 2D vector s=$(x_s, y_s)$ and the receiver position may be a 2D vector g=$(x_g, y_g)$. If the receivers are aligned along a direction, the x-axis may be aligned with this direction. Thus, the x-axis may be referred to as the in-line axis and the y-axis may be referred to as the cross line axis (or Xline). Further, a geometry of a 3D prestack data set may be defined in a 4D continuum as $(x_s, y_s, x_g, y_g)$, and the data may be defined in a 5D continuum $(t, x_s, y_s, x_g, y_g)$, where t is recording time. Each trace may represent a discrete sample in the 4D geometry space. The geometry space may be sampled along all axes.

To facilitate generating an image using the seismic data including image trace data from each seismic data acquisition unit (or image trace data generated from field trace data detected from the seismic data acquisition units), the data processing system can construct a 3D angle gather at a fixed (x,y) position using the seismic data. A 3D image is a function of (x,y,z) and a 3D angle gather is a function of ($\phi,\gamma,z$). To construct the 3D angle gather, the data processing system 305 extracts an image trace at the (X,Y) location from each migrated common receiver gather or common shot gather. In some embodiments, the trace mapper 310 may perform one or more aspect of migration. Migration may refer to removing the effects of wave propagation from the surface to reflectors and back to the surface. The trace mapper may be configured with one or more wave propagation techniques to perform the migration, including, e.g., Kirchhoff migration, constant-velocity migration, migration in heterogeneous media, anisotropic migration. For example, the data processing system 305 may use common-image gathers (or common receiver gathers or common shot gathers) generated via Kirchhoff migration techniques. The data processing system 305 may further utilize angle-domain common-image gathers. Angle-domain Kirchhoff imaging may be based on reflector-centered parameterization of migration summation surfaces. The summation surfaces may be parameterized as functions of the angles at the reflection point.

Thus, the data processing system 305 (e.g., via trace mapper 310) may perform various pre-processing steps or pre-imaging steps. These pre-processing steps may include suppression of multiple reflections (e.g., source-side or receiver side). In some cases, where the seismic data is in a common shot domain, the data processing system 305 may perform 3D migration imaging of the seismic data in order to find a location of the reflector in the earth. For example, the data processing system 305 may be configured to run a wave equation backwards to back propagate the wave. From this, the data processing system 305 may determine a location and amplitude. In some cases, the data processing system 305 may use a velocity model to back propagate the wave to identify the location of the reflector. The data processing system 305 may perform an iterative loop where the velocity model or other parameters may be adjusted to improve the accuracy of the velocity model. The data processing system 305 can use these techniques to generated a direction of a normal vector at each reflector, which can indicate how a reflector in a subsurface location is angled.

Figure 4:
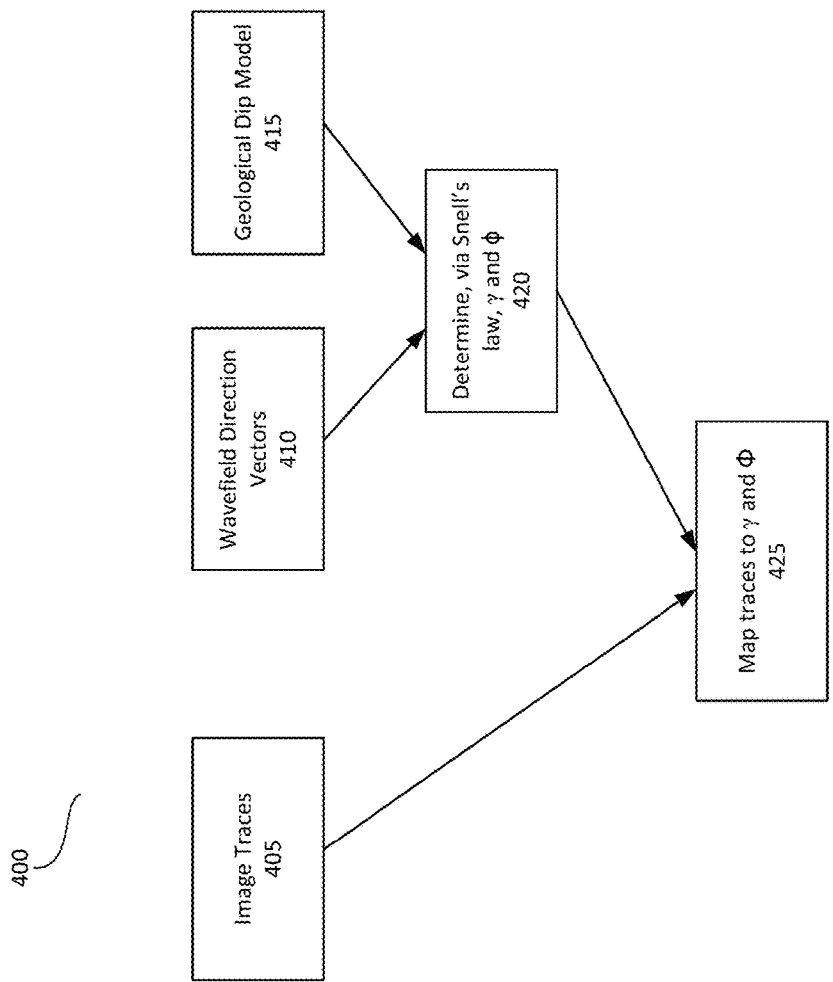
FIG. 4 is a flow diagram of an embodiment of a method for mapping image traces to an angle domain.

In some embodiments, the data processing system 305 (e.g., trace mapper 310) may be configured to perform the functions illustrated in process 400 shown in FIG. 4 to map the image traces to angles. The data processing system 305 can obtain image traces at block 405. The data processing system 305 may further perform preprocessing on the image traces at block 405, such as suppressing multiple source or receiver reflections. The data processing system 305 can obtain wavefield direction vectors at block 410 and a geological dip model at block 415. For example, the data processing system 305 can back propagate a wave using a wave equation to determine wavefield direction vectors at block 410. The data processing system 305 can use reverse time migration to determine wavefield direction vectors at block 410. The data processing system 305 can obtain a geological dip model that includes information about an amount of dip or angle of one or more reflectors. The data processing system 305 can generate the geological dip model in an iterative process using one or more images generated using angle gathers. Using the wavefield direction vectors 410 and geological dip model 415, the trace mapper 310 can determine, via Snell's law, the subsurface reflection azimuth angle ("$\phi$") and the subsurface reflection angle ("$\gamma$") associated with a reflector at block 420.

Figure 5:
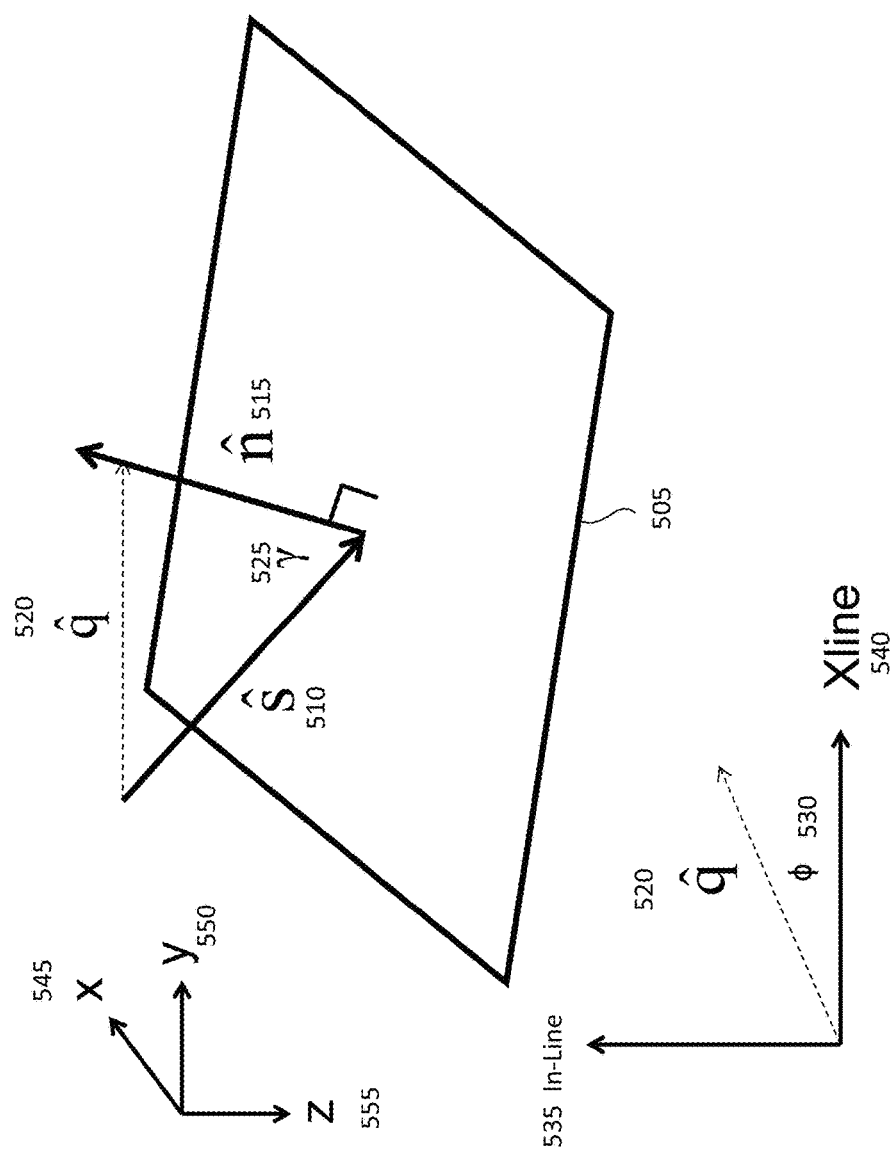
FIG. 5 is a diagram of reflection angles used to construct a 3D angle gather, in accordance with an embodiment.

FIG. 5 is a diagram that illustrates angles determined or constructed using Snell's law. The reflector 505 may represent a subsurface lithological formation or hydrocarbon deposit. The reflector 505 may reflect a seismic wave generated by a seismic source (such as a shot). The unit vector S 510 represents a source direction or Poynting vector derived for each shot during shot migration (e.g., block 410 in FIG. 4). The vector n 515 represents the unit normal to the reflector 505 at an image point (x,y,z) derived from a subsurface geological dip model (e.g., block 415 in FIG. 4). The plane or reflection is the plane containing vectors S 510 and n 515. The vector q 520 represents the azimuthal illumination direction, which may refer to the intersection of the plane of reflection (e.g., the plane containing vectors S 510 and n 515) with a horizontal plane. Angle $\phi$ 530 is the azimuth at (x,y,z), which may be the angle between vector q 520 and the cross line 540 ("Xline"). The cross line 540 and in-line 535 may form a 90 degree angle, in some embodiments. Angle $\gamma$ 525 is the reflection angle formed between vectors S 510 and the normal vector n 515. Thus, each location on the x 545 and y 550 axes may have multiple depth samples on the depth z 555 axis. The data processing system 305 can determine, for each of the multiple depth samples for each location, an angle $\phi$ 530 and $\gamma$ 525.

Upon determining, via Snell's law, the $\phi$ 530 and $\gamma$ 525 angles at block 420, the trace mapper 310 can map the image trace to the angles $\phi$ 530 and $\gamma$ 525 at block 425. The trace mapper 310 can determine the angles ($\phi, \gamma$) associated with each depth sample of each image trace. For example, the trace mapper 310 obtains seismic data that includes a set of N image traces at a fixed surface location (x,y) that derive from imaging N common receiver gathers. The $n^{th}$ n of these image traces for fixed (x,y) may be represented by $I_n(z)$. The trace mapper 310 can also obtain, identify, or determine a depth variable z mapping of each image trace to the angle domain. For example, the mapping for the $n^{th}$ image trace and fixed (x,y) can be $(x,y,z)_n \rightarrow [\phi_n(z), \gamma_n(z)]$. The trace mapper 310 may store the mapping in an image trace data structure or angle mapping data structure in database 325.

The data processing system 305 may include a binning engine 315 designed and constructed to apply a bandlimited binning function to generate an angle gathers grid using the image trace data. The binning engine 315 can define or initiate a 3D angle gathers grid using coordinates ($\phi,\gamma,z$) and use a bandlimited binning technique to determine the nearest location in the angle gathers grid for each depth sample of each image trace. The binning technique can include a bandlimited binning function.

The binning engine 315 can retrieve, from a binning function data structure in database 325, a binning function, a sampling interval, and a parameter. The sampling intervals may include $\Delta\phi$ and $\Delta\gamma$. Parameters may refer to tuning parameters such as $\alpha$ and $\beta$. The tuning parameters may be real number $\geq 1$. In some embodiments, the binning function includes a bandlimited binning function, such as a sinc function. Using the sampling interval and parameters, the binning engine 315 can configure the binning function. For example, the binning engine 315 can configure the binning functions for $\phi$ and $\gamma$ as follows:

$$\mathrm{sinc}(\phi) = \sin(\pi\phi/\beta\Delta\phi)/(\pi\phi/\beta\Delta\phi);$$

$$\mathrm{sinc}(\gamma) = \sin(\pi\gamma/\alpha\Delta\gamma)/(\pi\gamma/\alpha\Delta\gamma).$$

Figure 6:
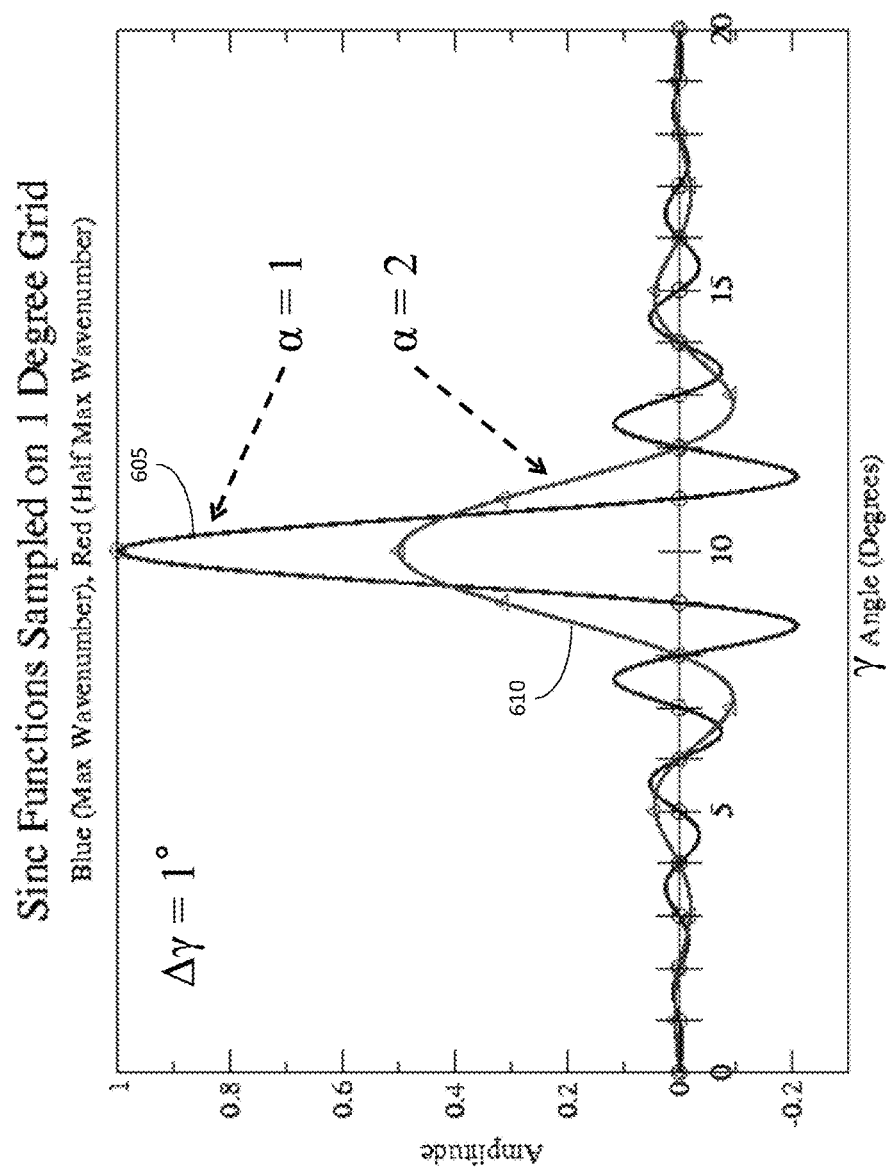
FIG. 6 is a diagram of bandlimited binning function, in accordance with an embodiment.

FIG. 6 illustrates a diagram of a sinc function used by the binning engine 315 to perform bandlimited binning, in accordance with an embodiment. The sinc function shown in FIG. 6 illustrates the $\mathrm{sinc}(\gamma)$ binning function. The binning engine may generate a similar plot for the $\mathrm{sinc}(\phi)$ bandlimited binning function.

In the $\mathrm{sinc}(\gamma)$ diagram shown in FIG. 6, line 605 represents the max wavenumber sinc function (max amplitude of 1) where the tuning parameter $\alpha=1$, and the line 610 represents the half-max wavenumber sinc function (max amplitude of 0.5) where the tuning parameter $\alpha=2$. The sampling interval $\Delta\gamma$ is set at 1 degree. The sampling interval and tuning parameter may be adjusted by the data processing system or by a user of the data processing system. For example, adjusting the sampling interval and tuning parameter may be done responsive to analyzing or viewing angle gathers or an image generated using this binning function, where the adjusted sample interval or tuning parameter produces an updated or new angle gathers or image with fewer noise artifacts due to aliasing.

In some embodiments, the binning engine 315 can initialize, maintain, retrieve or otherwise identify a 3D angle gathers grid. The 3D angle gathers grid can be uniformly sampled at intervals $\Delta\phi$, $\Delta\gamma$ and $\Delta z$. The data processing system may initialize the grid by placing a 0 value at every location in the grid. In some cases, the $\Delta z$ may be chosen to equal the depth sample interval of the seismic image traces. The binning engine 315 can use the binning function configured with the sampling intervals and parameters to populate the 3D angle gathers grid. The binning engine 315 can populate the 3D angle gathers grid for a fixed surface image location (x,y) as follows:

$$G(x,y;\phi,\gamma,z) = \Sigma_n I_n(z)\mathrm{sinc}[\phi-\phi_n(z)]\mathrm{sinc}[\gamma-\gamma_n(z)],$$

In this equation, $G(x,y;\phi,\gamma,z)$ represents an amplitude for the 3D angle gather at a location in the grid $(x,y;\phi,\gamma,z)$; $\Sigma_n$ represents a summation from n=1 to n=N number of image traces obtained from a plurality of seismic data acquisition units (e.g., from a single shot); $I_n(z)$ represents an amplitude of an image trace at a fixed location (x,y) for a depth (z); $\mathrm{sinc}[\phi-\phi_n(z)]$ represents the bandlimited binning function configured for $\phi$, and $\mathrm{sinc}[\gamma-\gamma_n(z)]$ represents the bandlimited binning function configured for $\gamma$.

The binning engine 310 can apply the bandlimited binning function to a plurality of image traces of the image trace data to generate a bandlimited angle gather for a location in an angle gathers grid. The location may refer to a bin in a 3D angle gathers grid defined by ($\phi,\gamma,z$). The 3D angle gathers grid may be for a fixed location (x,y), while the angles $\phi$ and $\gamma$ and depth z vary. The angles $\phi$ and $\gamma$ may vary in a uniform manner, while the depth z may vary in a uniform manner or based on the depth sample data available in the seismic data. In some embodiments, $\Delta\phi$ may equal $\Delta\gamma$, while in some embodiments they may be different. In some embodiments, $\phi$ and $\gamma$ may be in radians, while in some embodiments they may be in degrees.

The binning engine can perform the summation $\Sigma_n$ from n=1 to n=N image traces and allow all N image traces to contribute to the 3-D angle gather $G(x,y;\phi,\gamma,z)$. The 3D angle gathers grid for a fixed location (x,y) may include a plurality of bins defined by ($\phi,\gamma,z$). The binning engine 315 populates each bin by summing a plurality of image traces by applying the binning function configured above.

For example, the seismic data may include data for two image traces, a first image trace and a second image trace. The two image traces may correspond to the same location (x,y). The location (x,y) may refer to a reflector location, source location, or receiver location. The first image trace may map to a first azimuth angle and a first reflection angle at a first depth, and the second image trace may map to a second azimuth angle and a second reflection at the first depth. To populate the grid, the binning engine 315 determines a value to place in each bin. For example, for a first bin where ($\phi=1,\gamma=1,z=300$), the binning engine 315 may determine the difference between the azimuth angle represented by the bin and the azimuth angle that maps to the image trace at a depth of 300 meters, and then determine a first sinc value of the sinc function with a corresponding tuning parameter as a function of the difference of the azimuth angles. The binning engine 315 may further determine the difference between the reflection angle represented by the bin and the reflection angle that maps to the image trace at a depth of 300, and then determine a second sinc value of the sinc function with a corresponding tuning parameter as a function of the difference of reflection angles. The binning engine 315 may combine the first sinc value with the second sinc value (e.g., by multiplying) to generate a first weighting value for the bin for the image trace. The binning engine 315 may apply the weighting value to the image trace amplitude at the corresponding depth to generate a first value for the bin. The binning engine 315 can similarly determine a second value for the bin using a second image trace. The binning engine 315 can sum the first value of the first image trace with the second value of the second image trace to generate a bandlimited 3D angle gather value for the bin in the fixed (x,y) angle gathers grid that corresponds to bin ($\phi=1,\gamma=1,z=300$). The binning engine 315 can add the 3D angle gather value to the bin value. If the bin value is initialized to 0 and this is the first summation, then the bin value may be this 3D angle gather value. The binning engine 315 can continue to determine the 3D angle gather value for all image traces and all bins ($\phi,\gamma,z$) in the 3D angle gathers grid.

Thus, for a bin in the angle gathers grid defined by ($\phi,\gamma,z$), the binning engine 315 may determine the value by applying the binning function to a first image trace to determine a first value and then applying the binning function to a second image trace to determine a second value, and then sum the first value and the second value to determine to determine a 3D angle gather value to use to populate the corresponding bin in the angle gathers grid.

By using the bandlimited binning function, the binning engine 315 can select or use Δϕ and Δγ as desired. Further, the data processing system 305 (or a user thereof) may increase tuning parameters β and α from 1 until the maximum angular wavenumbers are small enough to prevent, reduce, minimize, or mitigate aliased angle gathers. For example, the data processing system 305 may iteratively adjust the tuning parameters to generate updated or new images for display. A user of the data processing system may view the image to determine whether they have fewer or no artifacts. The data processing system 305 may generate a set of equivalent bandwidth angle gathers for different Δϕ and Δγ by varying the β and α so that the maximum angular wavenumbers π/βΔϕ and π/αΔγ remain constant.

Figure 7:
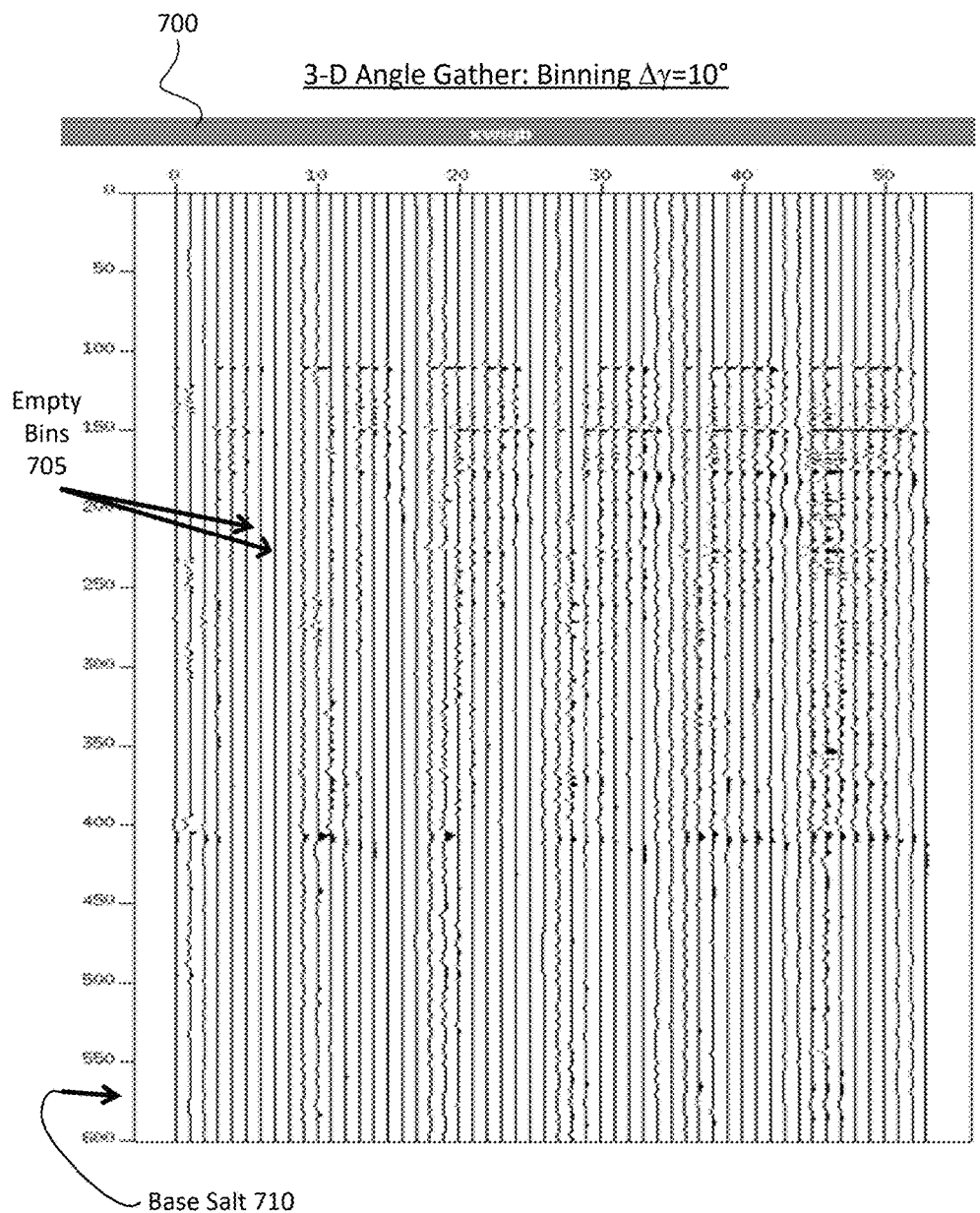
FIG. 7 is a diagram illustrating 3D angle gathers using a binning function, in accordance with an embodiment.
Figure 8:
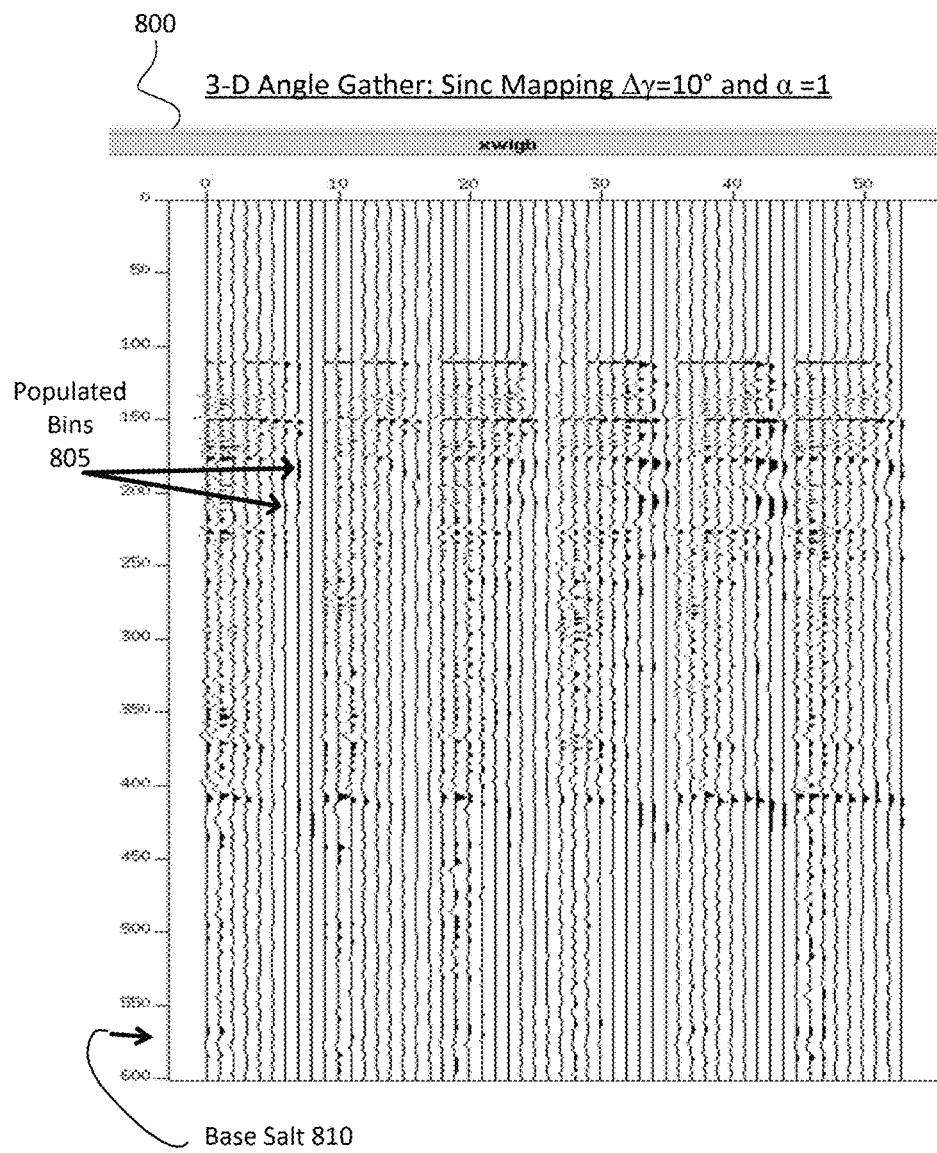
FIG. 8 is a diagram illustrating 3D angle gathers using a binning function, in accordance with an embodiment.
Figure 9:
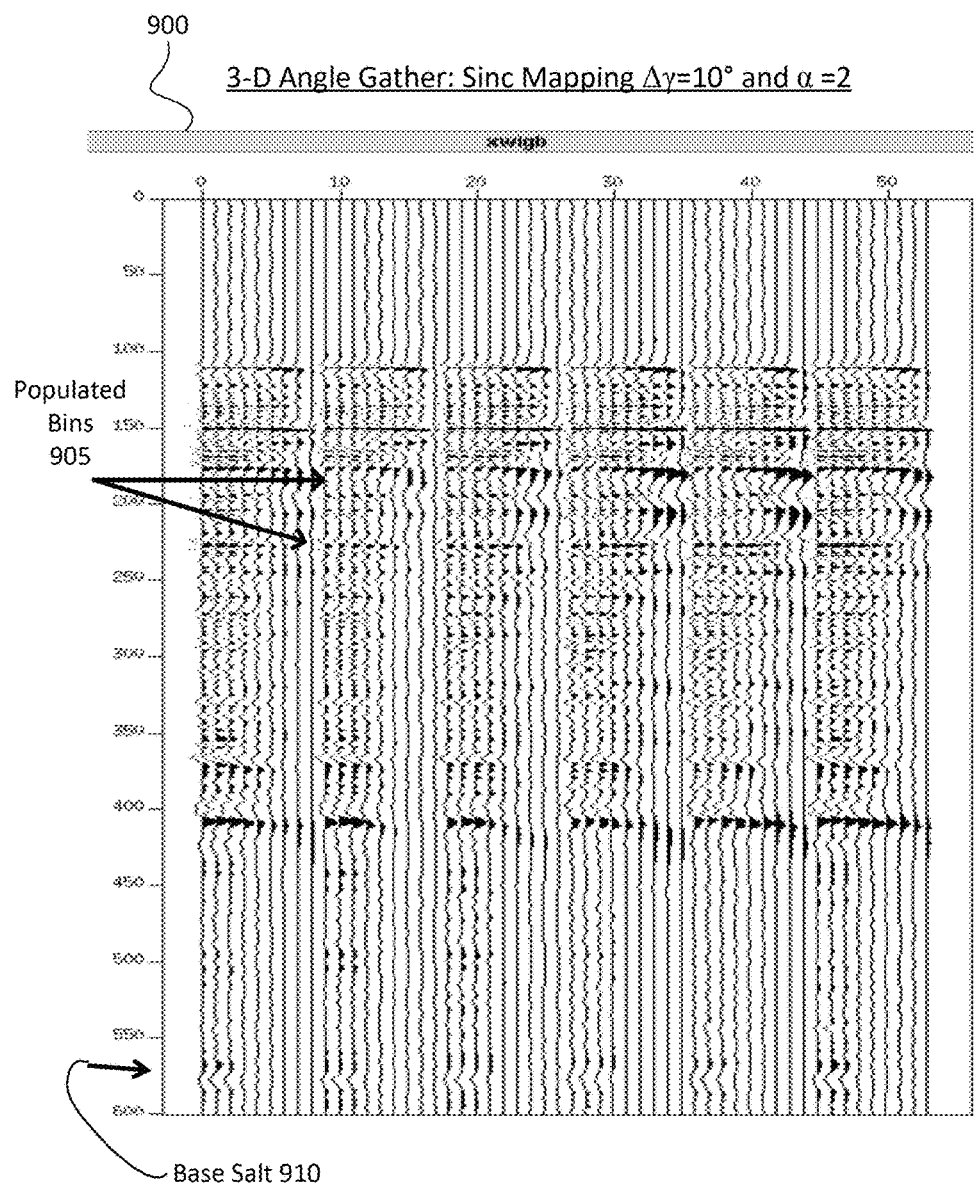
FIG. 9 is a diagram illustrating 3D angle gathers using a binning function, in accordance with an embodiment.

FIGS. 7-9 show diagrams illustrating 3D angle gathers using a binning function, in accordance with some embodiments. FIG. 7 illustrates a 3D angle gather 700 without using a bandlimited binning function. As shown in FIG. 7, there are several empty bins 705 which may cause unwanted noise and artifacts in an image generated using the 3D angle gather. The angle gather 700 also illustrates a base salt depth 710 at 575 meters below the surface. FIGS. 8 and 9 illustrate 3D angle gathers 800 and 900, respectively, generated using a bandlimited binning function with a reflection angle sample interval of 10 and a tuning parameter of 1 and 2, respectively. These 3D angle gathers grids 800 and 900 represent varying reflection angle, and depth for a fixed azimuth angle and (x,y) location. The vertical axis can represent depth and the horizontal axis can represent reflection angle. In some embodiments, the depth may be the horizontal axis and the reflection angle may be the vertical axis. At a depth of about 575 meters below the surface of the earth, the diagram shows base salt (810 or 910). As shown in FIGS. 8 and 9, the bins that were empty in FIG. 7 are populated bins 805 and 905, respectively, as a result of the bandlimited binning function.

The data processing system 305 can include an image generator 320 designed and constructed to generate an image based on the bin values of the 3D bandlimited angle gather grid populated by the binning engine 315. The image generator 320 may generate the image using an imaging function. The imaging function may select a color from a color scale corresponding to the bin value. The color scale may include a gray scale or a color scale with different colors. The scale may range from a minimum bin value to a maximum bin value. The image may be normalized according to a predetermined scale (e.g., 0 to 10).

To generate an image with few or no unwanted artifacts due to undersampling or aliasing, the data processing system can apply bandlimited binning function to construct unaliased 3D angle gathers regardless of the Δϕ and Δγ that are chosen to define the 3D angle gathers grid. Poor quality angle gathers can result in reduced quality image simply because the critical velocity estimation step may not be successful. Thus, by generating improved quality angle gathers using the bandlimited binning function that can be tuned based on sampling intervals and parameters, the data processing system can generate not only improved angle gathers (e.g., 2D or 3D) but also an improved image.

Figure 10:
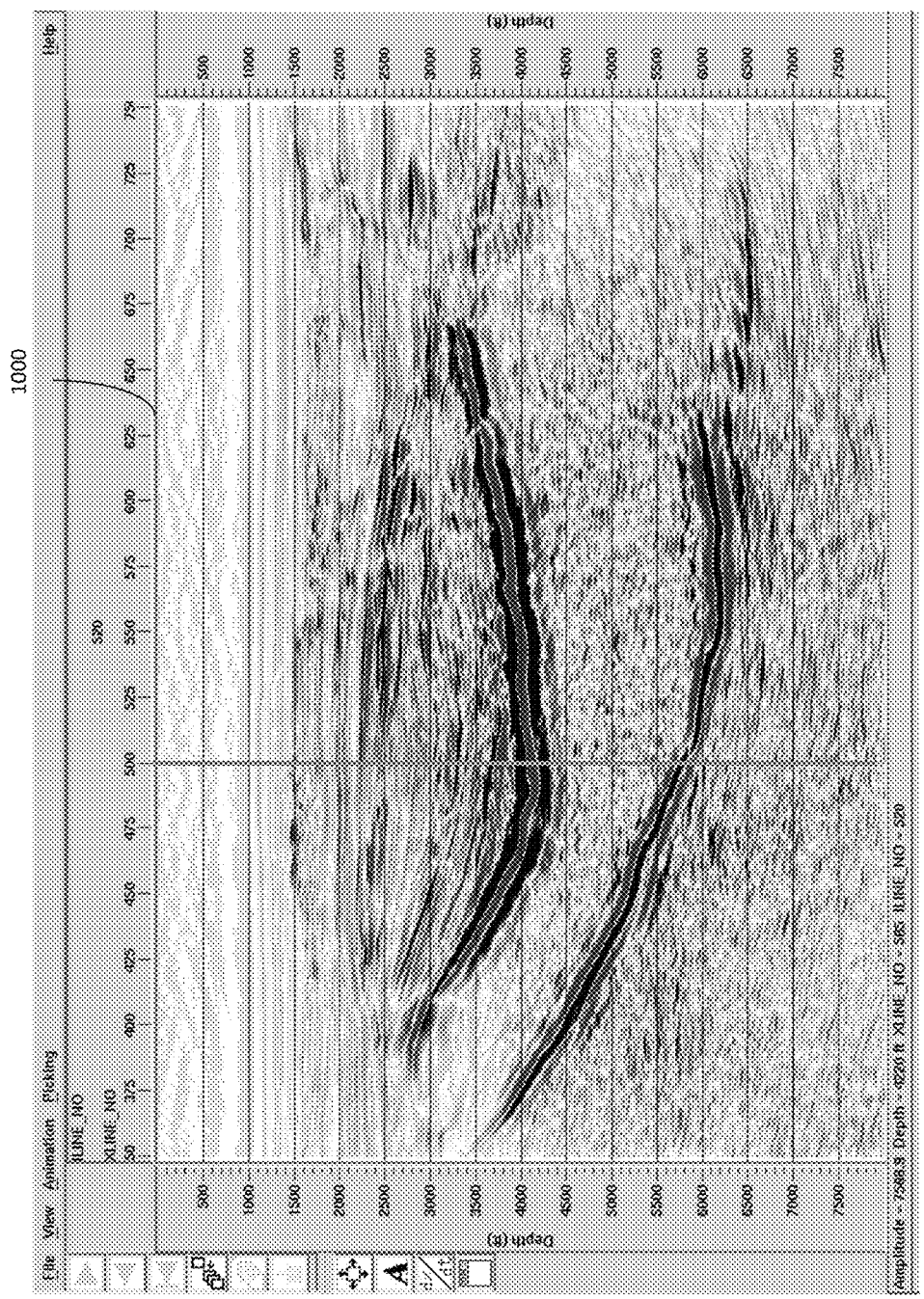
FIG. 10 is a diagram illustrating an image of a 3D angle gather in accordance with an embodiment.

FIG. 10 illustrates an image 1000 generated by the image generator 320. The vertical axis represents depth in feet, and the horizontal axis represents a cross line number. This image 1000 represents an image slice at inline 520. The image generator 320 can use bandlimited 3D angle gathers in an iterative velocity estimation and imaging loop that results in the final image 1000 illustrated in FIG. 10. Angle gathers play a fundamental role in the imaging loop more than in directly generating the image. The bandlimited 3D angle gathers used to generate the image may be constructed by summing image traces from a plurality of seismic data acquisition units.

Figure 11:
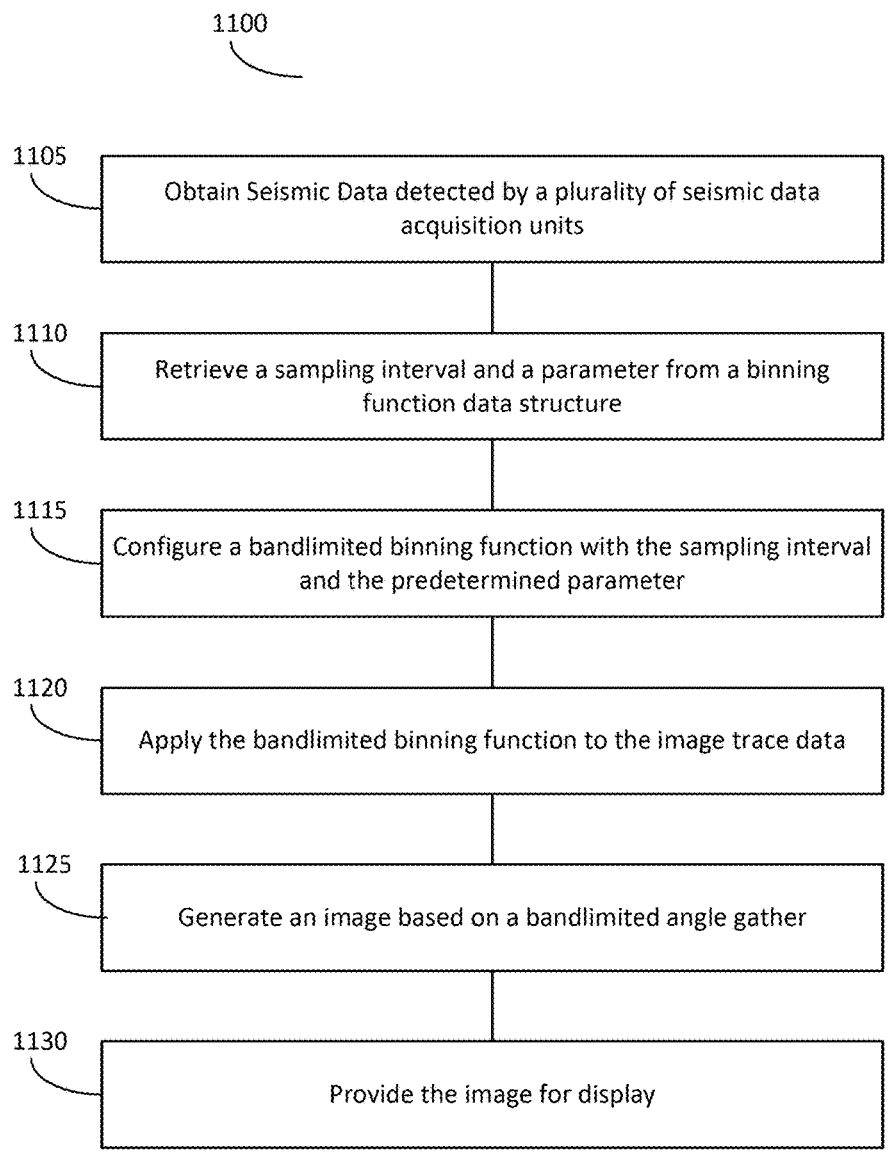
FIG. 11 is a flow diagram of an embodiment of a method for detecting subsurface matter via a seismic survey.

FIG. 11 is a flow diagram of an embodiment of a method for detecting subsurface matter via a seismic survey. The method 1100 can be performed by system 300, data processing system 305, display device 330, computing device 1200 or any component thereof. At 1105, the method includes the data processing obtaining seismic data detected by a plurality of seismic data acquisition units. The seismic data acquisition units can be separated from each other by at least a threshold distance on a ground surface. The threshold distance may be greater than 400 meters and range up to 1100 meters. The seismic data can include image trace data from each of the plurality of seismic data acquisition units. The data processing system may obtain the image trace data from a first data structure stored in memory, such as an image trace data structure.

At 1110, the data processing system can retrieve, from a binning function data structure in memory, a sampling interval and a parameter. The sampling interval may include an azimuth angle interval and a reflection angle interval. The parameter may include tuning parameters that can be used in a bandlimited binning function.

In some embodiments, the data processing system receives the sampling interval and the tuning parameters via a user interface, such as a graphical user interface displayed by a display device of a computing device and an input device such as a keyboard, mouse or touch display. In some embodiments, the data structure may include multiple sampling intervals and tuning parameters, and the data processing system may generate a different image for each sampling interval and tuning parameter combination in order to identify the optimal image with the fewest artifacts due to noise or aliasing.

At 1115, the data processing system can configure the bandlimited binning function with the sampling interval and the parameter as follows:

$$\mathrm{sinc}(\phi) = \sin(\pi\phi/\beta\Delta\phi)/(\pi\phi/\beta\Delta\phi);$$

$$\mathrm{sinc}(\gamma) = \sin(\pi\gamma/\alpha\Delta\gamma)/(\pi\gamma/\alpha\Delta\gamma).$$

The data processing system may use a separate bandlimited binning function for the azimuth angle and the reflection angle. In some cases, the data processing system may use the same bandlimited function with the same sampling interval and tuning parameter, while in some cases the sampling interval and the tuning parameters may be different.

In some embodiments, the data processing system determines a reflection angle and an azimuth angle associated with each depth sample of each image trace of the image trace data. For example, the data processing system can generate direction vectors using a seismic velocity model generated from seismic data, field data or image trace data. The data processing system may then apply Snell's law to combine the direction vectors with a subsurface geological dip model and produce the reflection angle, and the reflection azimuth corresponding to the subsurface reflector. The data processing system may use these angles to determine the mapping of the image trace data to the angle domain or the angle gathers grid.

In some embodiments, the data processing system can suppress multiple reflections in the seismic data, such as multiple source reflection or multiple receiver reflection. Multiple reflection may refer to the same wave reflecting off of multiple surfaces or reflectors prior to being detected by the seismic data acquisition unit. The data processing system may analyze a properties of the image trace or detected wave to determine if it is a multiple reflection and suppress it. Properties may include detection time, amplitude, location, angles, phase etc. In some embodiments, the data processing system can generate, via a 3D migration imaging technique, direction vectors using the seismic data with the multiple reflections suppressed.

At 1120, the data processing system can apply the bandlimited binning function to a plurality of image traces of the image trace data to generate a bandlimited angle gather value for a bin in an angle gathers grid. The data processing system can store the bandlimited binned image trace data in a grid data structure in memory.

The data processing system can apply the bandlimited binning function to the reflection angle and the azimuth angle associated with each depth sample of each image trace to generate a plurality of bandlimited binned angle gathers. In one example, the data processing system can apply the binning function to generate a 3D angle gather for a fixed surface image location (x,y) as follows:

$$G(x,y,\phi,\gamma,z)=\Sigma_n I_n(z)\mathrm{sinc}[\phi-\phi_n(z)]\mathrm{sinc}[\gamma-\gamma_n(z)],$$

The data processing system can perform the summation $\Sigma_n$ from n=1 to n=N image traces and allow all N image traces to contribute to the 3-D angle gather $G(x,y;\phi,\gamma,z)$. The data processing system can generate a 3D angle gather grid for a single fixed (x,y) location, while varying the $\phi$, $\gamma$ and z and variables. As shown in the example equation above, the data processing system can use a bandlimited binning function that includes a sinc function.

In some embodiments, the data processing system can first establish or initialize the angle gathers grid with bins. The angle gathers grid may be uniformly sampled with a sample interval that includes a reflection angle interval and an azimuth angle interval. In some cases, the depth interval may also be uniformly sampled, while in other cases the depth interval may correspond to the available depth samples in the seismic data. The data processing system can initialize the angle gathers grid by placing a default value at each location in the angle gathers grid. The default value may be 0, a null value, 1, 5, 10 or some other value that facilitates initializing the angle gathers grid in order to perform bandlimited binning and generate an image.

The data processing system can sum multiple image traces when applying the bandlimited binning function. For example, the data processing system identifies a first image trace and a second image trace that map to a bin of the angle gathers grid based on the bandlimited binning function. The data processing system can determine a value for the bin by combining (e.g., adding, summing, multiplying, etc.) the first image trace with the second image trace.

At 1125, the data processing system can generate an image based on the bandlimited angle gather. The data processing system may generate the image based on the angle gathers grid that includes a plurality of bins. The bins may include values based on the application of the bandlimited binning function that generates the 3D angle gather. The value of the bin may be based on a summation of a plurality of values corresponding to a plurality of image traces for a plurality of seismic data acquisition units. The data processing system may use the bandlimited angle gathers to generate an updated velocity model, geological dip model, or other intermediary data structure or model that can be used to generate an updated image.

To generate an image with few or no unwanted artifacts due to undersampling or aliasing, the data processing system can apply bandlimited binning function to construct unaliased 3D angle gathers regardless of the $\Delta\phi$ and $\Delta\gamma$ that are chosen to define the 3D angle gathers grid. Poor quality angle gathers can result in reduced quality image simply because the critical velocity estimation step may not be successful. Thus, by generating improved quality angle gathers using the bandlimited binning function that can be tuned based on sampling intervals and parameters, the data processing system can generate not only improved angle gathers (e.g., 2D or 3D) but also an improved image.

At 1130, the data processing system provides the image for display via a display device, the image indicating at least one of a subsurface lithological formation and a hydrocarbon deposit. The image may be provided via a network for display on a display device, such as a communication network, computer network, or the Internet. The image may be in a data format, such as a bitmap, pixels, jpeg, PDF, vector-based format, etc. The data processing system may generate and display multiple images to generate an animation. For example, the multiple images may have varying sampling intervals or tuning parameters.

For example, the data processing system may receive or identify a second sample interval different from a first sampling interval used to generate a first image. The data processing system may re-configure the bandlimited binning function with the second sample interval. The data processing system may then generate a second image based on the bandlimited binning function configured with the second sample interval. In some embodiments, the data processing system may similarly tune parameters of the bandlimited binning function based on a bandwidth of the angle gathers grid. For example, the tuning parameters may be adjusted to suppress, mitigate, filter or remove high end frequencies by filtering out certain bandwidths. This may facilitate generating an image with fewer artifacts by removing aliasing.

For example, a first image generated using a first sample interval larger than a second sample interval may have fewer image artifacts than the second image if the tuning parameter is the same. In another example, lowering the tuning parameter for the second image may increase the number artifacts so it is comparable to the first image. However, the sampling interval may determine how much data is displayed on the image, thus it may be desirable to use a smaller sample interval and a larger tuning parameter. In some cases, an image with a higher sampling interval may have fewer artifacts if the tuning parameter is 1. In some cases, an image with a higher sampling interval may have fewer artifacts if the tuning parameter is 2 or 3 or 4 or greater. The data processing system can produce an updated image based on a second parameter, where the updated image has a number of artifacts due to noise or aliasing that is less than, different from, or lower than a number of artifacts of the first image.

In some embodiments, the data processing system can generate several images with several different tuning parameter values and allow the user to view the images in order to select an image with the fewest artifacts.

In some embodiments, the data processing system can receive, via a user interface of the data processing system, one or more additional sets of sample intervals and parameters different from the original set. Each set of sampling intervals can include one sampling intervals and one parameters. Each set of sampling intervals can include two sampling intervals and two parameters. One set may vary from the other set based on a different in a sampling interval, a parameter, or both. For example, a first set of sampling intervals and parameters may include: $\Delta\phi=2$, $\Delta\gamma=2$, $\beta=1$, and $\alpha=1$; a second set of sampling intervals and parameters may include: $\Delta\phi=10$, $\Delta\gamma=10$, $\beta=2$, and $\alpha=2$; and a third set of sampling intervals and parameters may include: $\Delta\phi=7$, $\Delta\gamma=5$, $\beta=3$, and $\alpha=3$.

The data processing system can configure the bandlimited binning function with these additional sets to generate angle gathers from each of these sets of sample intervals and parameters. The data processing system can tune the bandlimited binning function by choosing one set of sample intervals and parameters that produced high quality angle gathers. High quality angle gathers can refer to angle gathers that are not undersampled or aliased. The data processing system can generate an image based on the tuned bandlimited binning function with the set of sampling intervals and parameters that produce the high quality angle gathers.

Figure 12:
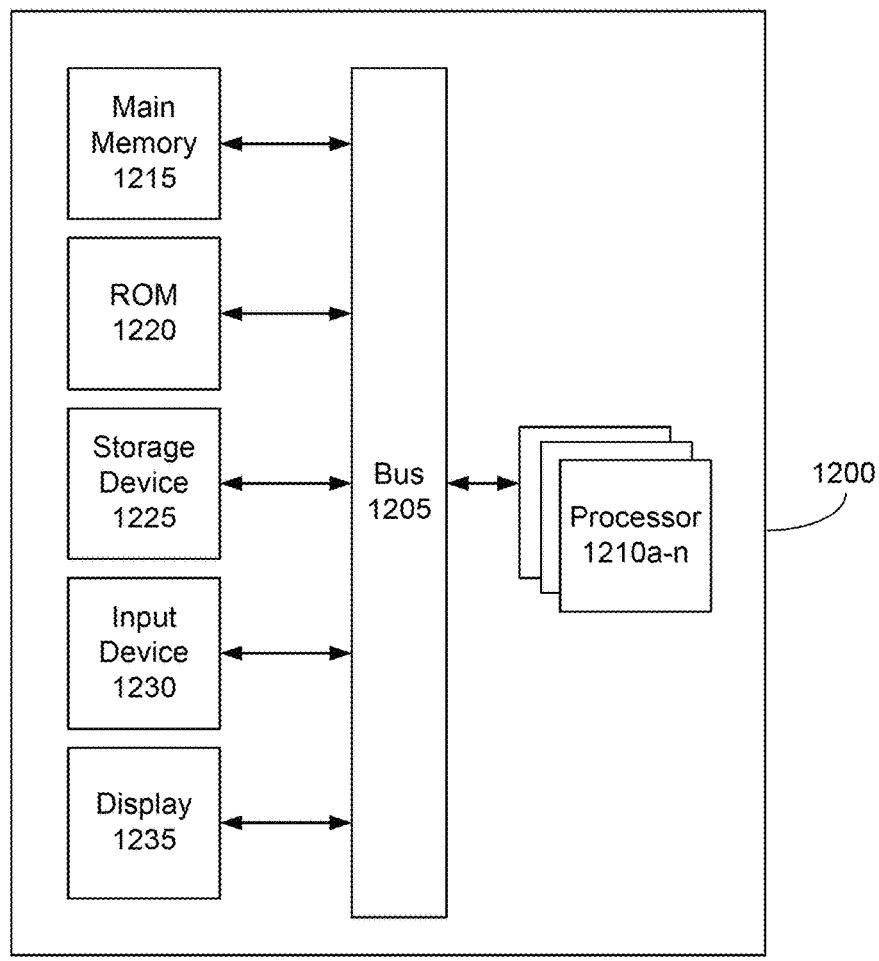
FIG. 12 is a block diagram illustrating a general architecture for a computer system that may be employed to implement various elements of the embodiments shown in FIGS. 1-10.

FIG. 12 is a block diagram of a computer system 1200 in accordance with an embodiment. The computer system or computing device 1200 can be used to implement the system 300, data processing system 305, binning engine 315, image generator 320, display device 330, or database 325. The computing system 1200 includes a bus 1205 or other communication component for communicating information and a processor 1210(a-n) or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing seismic data, binning function data, images, reports, tuning parameters, executable code, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235 or display device 330, such as a liquid crystal display, or active matrix display, for displaying information to a user. An input device 1230, such as a keyboard including alphanumeric and other keys, may be coupled to the bus 1205 for communicating information and command selections to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In some embodiments, hard-wired circuitry may be used in place of or in combination with software instructions to effect illustrative implementations. Thus, embodiments are not limited to any specific combination of hardware circuitry and software.

Although an example computing system has been described in FIG. 11, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of detecting subsurface features via a seismic survey that manages image artifacts and resource utilization, comprising:
    obtaining, by one or more processors of a data processing system, seismic data detected by a plurality of seismic data acquisition units separated from each other by at least a threshold distance on a ground surface, the seismic data comprising image trace data for each of the plurality of seismic data acquisition units;
    retrieving, by the data processing system from a binning function data structure in memory, a sampling interval and a parameter;
    configuring, by the data processing system based on the threshold distance separating the plurality of seismic data acquisition units, a bandlimited binning function with the sampling interval and the parameter;
    applying, by the data processing system, the bandlimited binning function to a plurality of image traces of the image trace data to generate a bandlimited angle gather value for a bin in an angle gathers grid;
    generating, by the data processing system, an image based on the angle gathers grid; and
    providing, by the data processing system, the image for display via a display device, the image indicating at least one of a subsurface lithological formation and a hydrocarbon deposit.

2. The method of claim 1, comprising:
    determining, by the data processing system, a reflection angle and a reflection azimuth angle associated with each depth sample of each image trace of the image trace data; and
    applying, by the data processing system, the bandlimited binning function to the reflection angle and the reflection azimuth angle associated with each depth sample of each image trace to generate a plurality of bandlimited binned angle gathers.

3. The method of claim 1, comprising:
    providing, by the data processing system, the angle gathers grid uniformly sampled with the sampling interval, the sampling interval comprising a reflection angle interval and an azimuth angle interval; and
    initializing the angle gathers grid by placing a default value at each location in the angle gathers grid.

4. The method of claim 1, comprising:
    receiving, via a user interface of the data processing system, a second sample interval different from the sampling interval;

configuring the bandlimited binning function with the second sample interval; and
generating, by the data processing system, a second image based on the bandlimited binning function configured with the second sample interval.

5. The method of claim 1, wherein the ground surface is below a surface of water.

6. The method of claim 1, comprising:
positioning, by a remotely operated vehicle, the plurality of seismic data acquisition units on the ground surface in an array defined by a plurality of lines of seismic data acquisition units.

7. The method of claim 1, wherein the threshold distance is between 400 meters and 1100 meters.

8. The method of claim 1, comprising:
generating, by the data processing system, direction vectors; and
applying Snell's law to combine the direction vectors with a subsurface geological dip model to produce the reflection angle and reflection azimuth that are used to generate bandlimited angle gathers.

9. The method of claim 1, further comprising:
obtaining, by the data processing system, field trace data detected by the plurality of seismic data acquisition units; and
imaging, by the data processing system, using seismic migration, the field trace data to produce the image trace data.

10. The method of claim 1, comprising:
applying, by the data processing system, the bandlimited binning function to the plurality of image traces of the image trace data to generate bandlimited angle gathers at a set of (x,y) image locations.

11. The method of claim 1, comprising:
receiving, via a user interface of the data processing system, one or more additional sets of sampling intervals and parameters different from the sampling interval and the parameter;
configuring the bandlimited binning function with the one or more additional sets; and
generating, by the data processing system, additional angle gathers from each of the one or more additional sets of sampling intervals and parameters;
tuning, by the data processing system, the bandlimited binning function by selecting a second sampling interval and a second parameter of the one or more additional sets that produced second angle gathers with fewer artifacts than first angle gathers produced using the sampling interval and the parameter;
generating, by the data processing system, a second image based on the second angle gathers produced using the tuned bandlimited binning function.

12. The method of claim 1, comprising:
producing an updated image based on a second parameter, the updated image having a number of artifacts due to noise or aliasing that is less than a number of artifacts of the image.

13. A system for detection of subsurface matter via a seismic survey that manages image artifacts and resource utilization, comprising:
a plurality of seismic data acquisition units separated from each other by at least a threshold distance on a ground surface;
a data processing system comprising a binning engine and an image generator executed by one or more processors to:
obtain seismic data detected by the plurality of seismic data acquisition units separated from each other by the at least the threshold distance on the ground surface, the seismic data comprising image trace data for each of the plurality of seismic data acquisition units;
retrieve, from a binning function data structure in memory, a sampling interval and a parameter;
configure, based on the threshold distance separating the plurality of seismic data acquisition units, a bandlimited binning function with the sampling interval and the parameter;
apply the bandlimited binning function to a plurality of image traces of the image trace data to generate a bandlimited angle gather value for a bin in an angle gathers grid;
generate an image based on the angle gathers grid; and
provide the image for display via a display device, the image indicating at least one of a subsurface lithological formation and a hydrocarbon deposit.

14. The system of claim 13, comprising the data processing system configured to:
determine a reflection angle and a reflection azimuth angle associated with each depth sample of each image trace of the image trace data; and
apply the bandlimited binning function to the reflection angle and the reflection azimuth angle associated with each depth sample of each image trace to generate a plurality of bandlimited binned angle gathers.

15. The system of claim 13, comprising the data processing system configured to:
provide the angle gathers grid uniformly sampled with the sampling interval, the sampling interval comprising a reflection angle interval and an azimuth angle interval; and
initialize the angle gathers grid by placing a default value at each location in the angle gathers grid.

16. The system of claim 13, comprising the data processing system configured to:
receive, via a user interface, a second sample interval different from the sampling interval;
configure the bandlimited binning function with the second sample interval; and
generate a second image based on the bandlimited binning function configured with the second sample interval.

17. The system of claim 13, wherein the ground surface is below a surface of water.

18. The system of claim 13, comprising the data processing system configured to:
position, by a remotely operated vehicle, the plurality of seismic data acquisition units on the ground surface in an array defined by a plurality of lines of seismic data acquisition units.

19. The system of claim 13, wherein the threshold distance is between 400 meters and 1100 meters.

20. The system of claim 13, comprising the data processing system configured to:
generate direction vectors; and
apply Snell's law to combine the direction vectors with a subsurface geological dip model to produce the reflection angle and reflection azimuth that are used to generate bandlimited angle gathers.

* * * * *